United States Patent
Koenig et al.

(10) Patent No.: US 9,132,967 B2
(45) Date of Patent: Sep. 15, 2015

(54) PRESSURE RELIEF TUBE FOR AUGER

(71) Applicants: Mark E. Koenig, Pickerington, OH (US); Larry E. Koenig, Canal Winchester, OH (US)

(72) Inventors: Mark E. Koenig, Pickerington, OH (US); Larry E. Koenig, Canal Winchester, OH (US)

(*) Notice: Subject to any disclaimer, the term of this patent is extended or adjusted under 35 U.S.C. 154(b) by 0 days.

(21) Appl. No.: 14/180,671

(22) Filed: Feb. 14, 2014

(65) Prior Publication Data

US 2014/0311869 A1    Oct. 23, 2014

Related U.S. Application Data

(60) Provisional application No. 61/765,674, filed on Feb. 15, 2013.

(51) Int. Cl.
*B65G 33/00* (2006.01)
*B65G 33/24* (2006.01)

(52) U.S. Cl.
CPC ........... *B65G 33/24* (2013.01); *Y10T 137/7837* (2015.04)

(58) Field of Classification Search
CPC ........ B65G 33/14; B65G 33/24; B65G 65/46; A01C 15/003; A01C 15/006
USPC ................. 198/550.6, 550.1, 657–677, 550.2
See application file for complete search history.

(56) References Cited

U.S. PATENT DOCUMENTS

| 4,274,790 A * | 6/1981 | Barker ........................... 198/668 |
| 4,881,862 A * | 11/1989 | Dick ............................... 198/671 |
| 5,099,986 A * | 3/1992 | Kuzub ............................ 198/666 |
| 2013/0149765 A1* | 6/2013 | Austin ........................... 435/167 |

* cited by examiner

*Primary Examiner* — James R Bidwell
(74) *Attorney, Agent, or Firm* — Standley Law Group LLP

(57) ABSTRACT

A pressure relief tube or enclosure such as for an auger screw. In one embodiment, a pressure relief tube may comprise at least one hatch that is adapted to expand in response to force applied from within the tube. An example of the pressure relief tube may automatically adapt or adjust to potential problem material in the tube to allow for conveyance or clearance of the problem material. Another example of the pressure relief tube may be manually adapted or adjusted to facilitate conveyance or clearance of the problem material. Related systems and methods comprising a pressure relief tube are also provided.

20 Claims, 5 Drawing Sheets

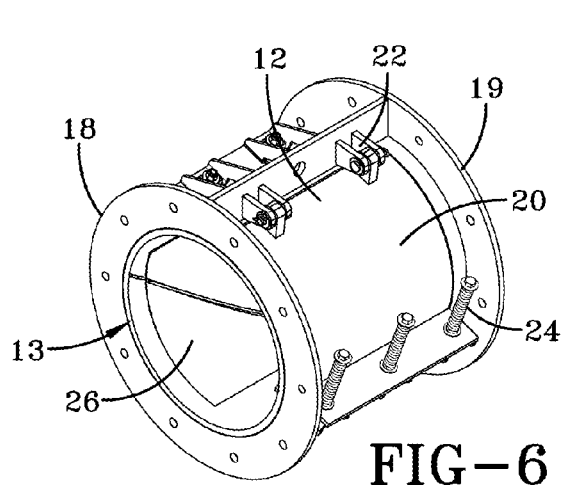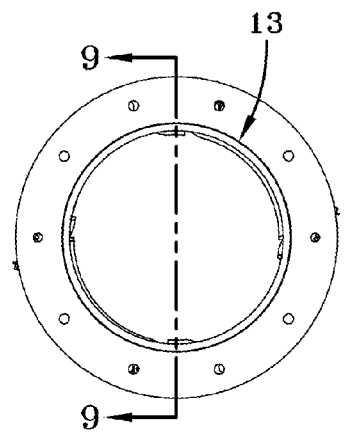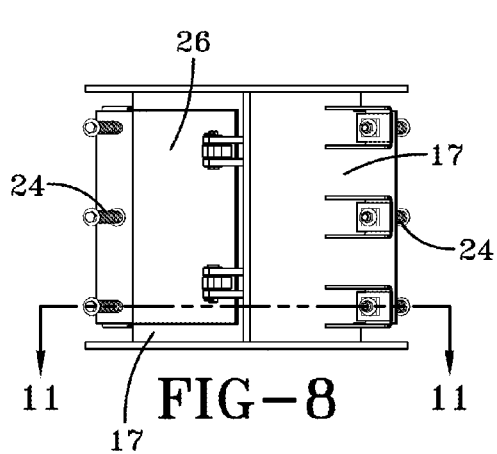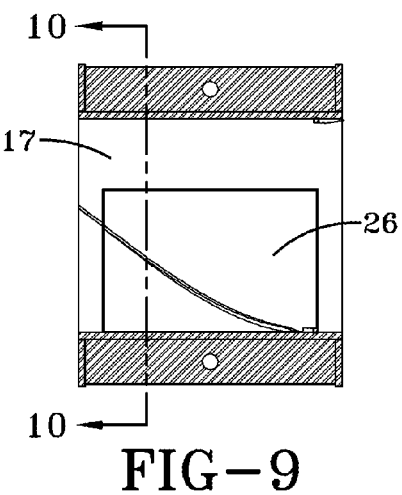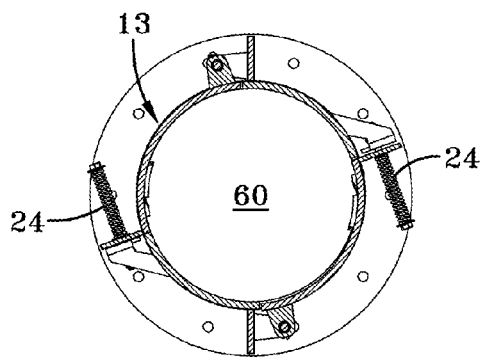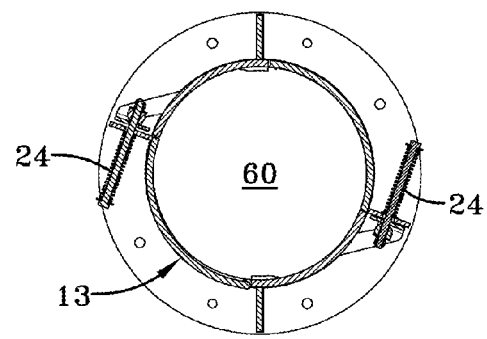

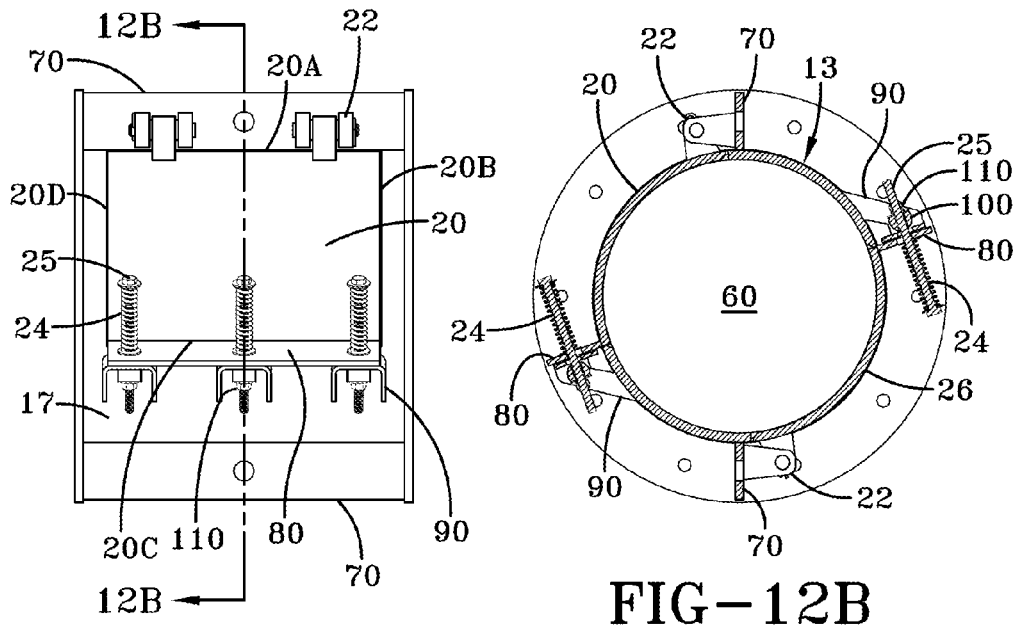
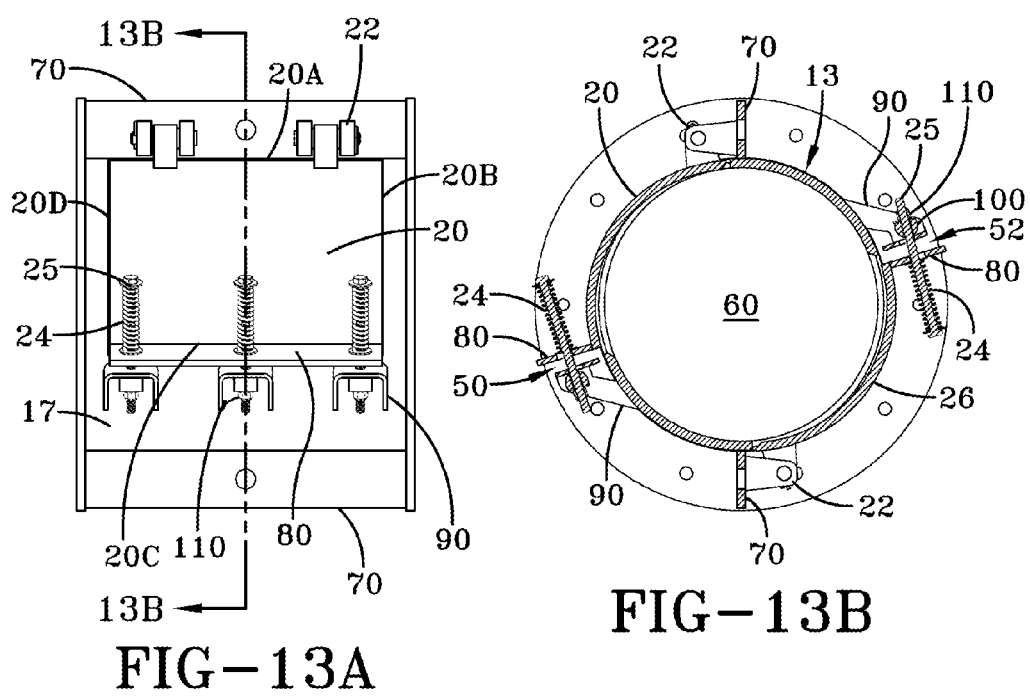

PRESSURE RELIEF TUBE FOR AUGER

This application claims the benefit of U.S. Provisional Application No. 61/765,674, filed Feb. 15, 2013, which is hereby incorporated by reference in its entirety.

BACKGROUND AND SUMMARY OF THE INVENTION

Exemplary embodiments of the present invention relate generally to auger systems, which may also be known as extrusion or screw systems. Hereafter, such systems will be collectively referred to as auger systems. There are number of different types of auger systems. Examples of auger systems may include, but are not limited to, compactors, crushers, shredders, feeders, material handlers, bale breakers, briquetters, and autoclave sterilizers. Other applications of auger systems are also possible.

An example of an auger system may be comprised of a screw that is adapted to convey material through a tube or other type enclosure. In a typical auger system, bulk material is transferred into the auger system for processing. For example, the bulk material may be waste material or recycling, which may be input to the auger system in batch loads or as a continuous feed.

A problem arises when a portion of the bulk material is not suitable for processing by the auger system. For example, a component or components of the bulk material may too large or comprised of the wrong material to be processed by the auger system. This is a particular concern when processing a material such as trash or recycling, which may be more prone to be comprised of some random material that is unsuitable for processing in the auger system.

Certain types of auger systems may be more susceptible to this type of problem. For instance, some auger systems may be designed to crush or compress the material between the screw and the outer tube or enclosure through which the material is conveyed. In such systems, there may be a tight clearance between the screw and the outer tube or enclosure in order to achieve the desired compression or crushing of the material. However, the tight clearance may also lead to random undesired material becoming wedged or otherwise stuck or jammed between the screw and the outer tube or enclosure. At the least, this will limit the conveyance of the material or otherwise hinder the efficiency of the auger system. It could also damage or break the auger system. In fact, it could stop the auger system. The same or similar problems may also occur with other types of auger systems.

In order to clear the problem, the auger system will often have to be shut down in order to remove the unsuitable material. Removal of the problem may be difficult and may require some disassembly of the auger system. This downtime for maintenance further limits the efficiency of the auger system, as no material can be conveyed while the problem is removed.

In view of these shortcomings of the known art, there is a need for an improved auger system or component for clearing or preventing potential jams. There is also a need for an improved auger system or component that automatically adapts or adjusts to the potential problem material so that it may be conveyed through the auger system. A need also exists for an improved auger system or component that automatically adapts or adjusts so that the problem material may be cleared from the auger system. Another need exists for an auger system or component that may be manually adjusted to allow for conveyance of the problem material through the auger system or for clearance of the problem material. Related methods for solving the aforementioned problems are also needed.

An exemplary embodiment of the present invention may satisfy one or more of the aforementioned needs. One exemplary embodiment may be comprised of a pressure relief tube or enclosure (hereinafter collectively referred to as a pressure relief tube) such as for an auger screw. An example of the pressure relief tube may, for example, automatically adapt or adjust to potential problem material to allow for conveyance or clearance of the problem material. Another example of the pressure relief tube may be manually adapted or adjusted to facilitate conveyance or clearance of the problem material. Related systems and methods comprising a pressure relief tube are also provided.

In addition to the novel features and advantages mentioned above, other benefits will be readily apparent from the following descriptions of the drawings and exemplary embodiments.

BRIEF DESCRIPTION OF THE DRAWINGS

FIG. 6 is a perspective view of an exemplary embodiment of a pressure relief tube of the present invention.

FIG. 7 is a front elevation view of the pressure relief tube of FIG. 6.

FIG. 8 is bottom plan view of the pressure relief tube of FIG. 6.

FIG. 9 is a cross-sectional view of the pressure relief tube of FIG. 7 along line A-A.

FIG. 10 is a cross-sectional view of the pressure relief tube of FIG. 9 along line B-B.

FIG. 11 is a cross-sectional view of the pressure relief tube of FIG. 8 along line C-C.

FIG. 12A is a side elevation view of an exemplary embodiment of a pressure relief tube of the present invention in a closed position.

FIG. 12B is a cross-sectional view of the pressure relief tube of FIG. 12A along line A-A.

FIG. 13A is a side elevation view of an exemplary embodiment of a pressure relief tube of the present invention in an adjusted position.

FIG. 13B is a cross-sectional view of the pressure relief tube of FIG. 13A along line B-B.

DETAILED DESCRIPTION OF EXEMPLARY EMBODIMENT(S)

Exemplary embodiments of the present invention are directed to a pressure relief tube for auger systems. Related auger systems and methods are also included. Exemplary embodiments may be useful for processing waste or recycling material. However, exemplary embodiments may also be useful for processing other types of material.

Figure 1:
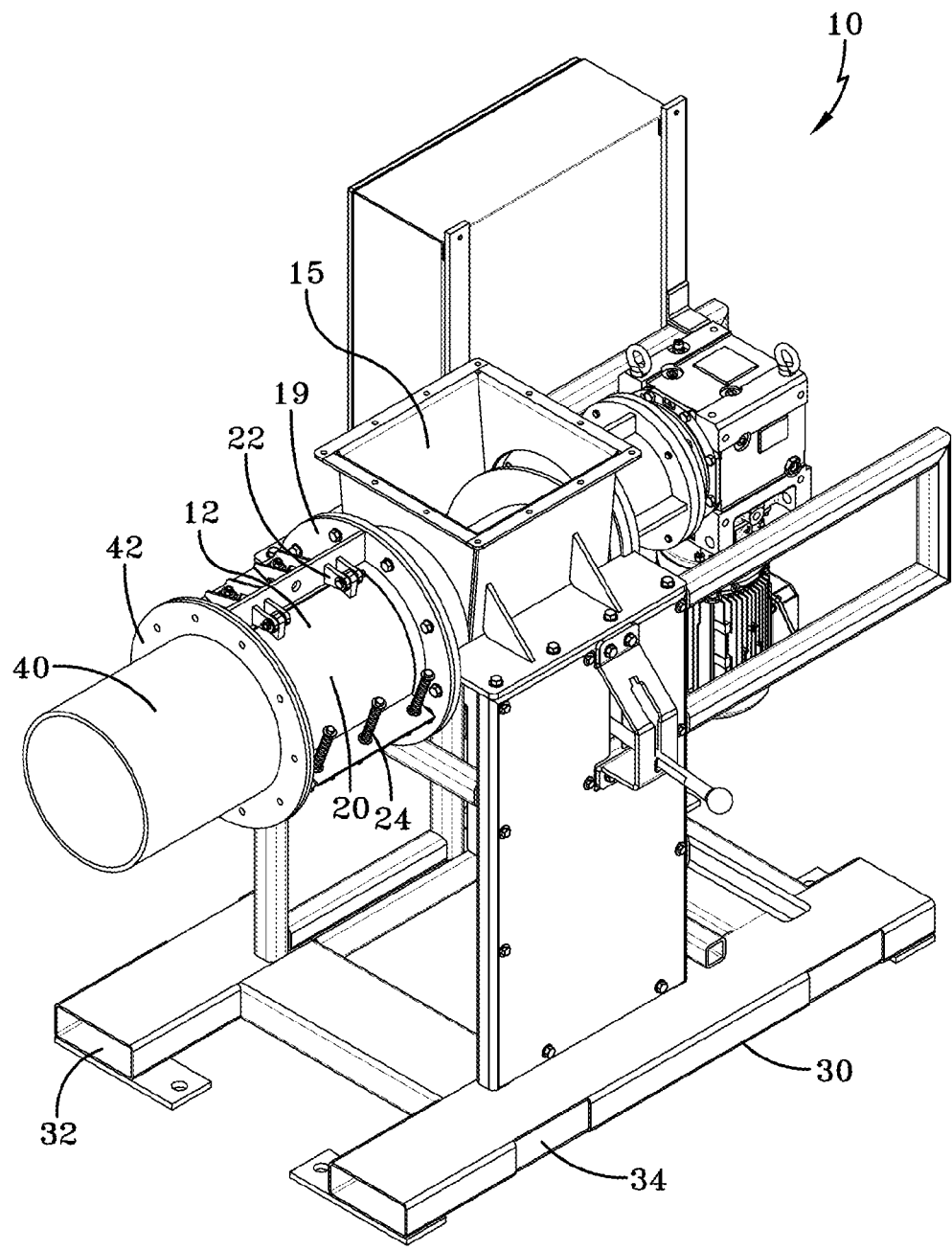
FIG. 1 is a perspective view of an exemplary embodiment of an auger system of the present invention.
Figure 2:
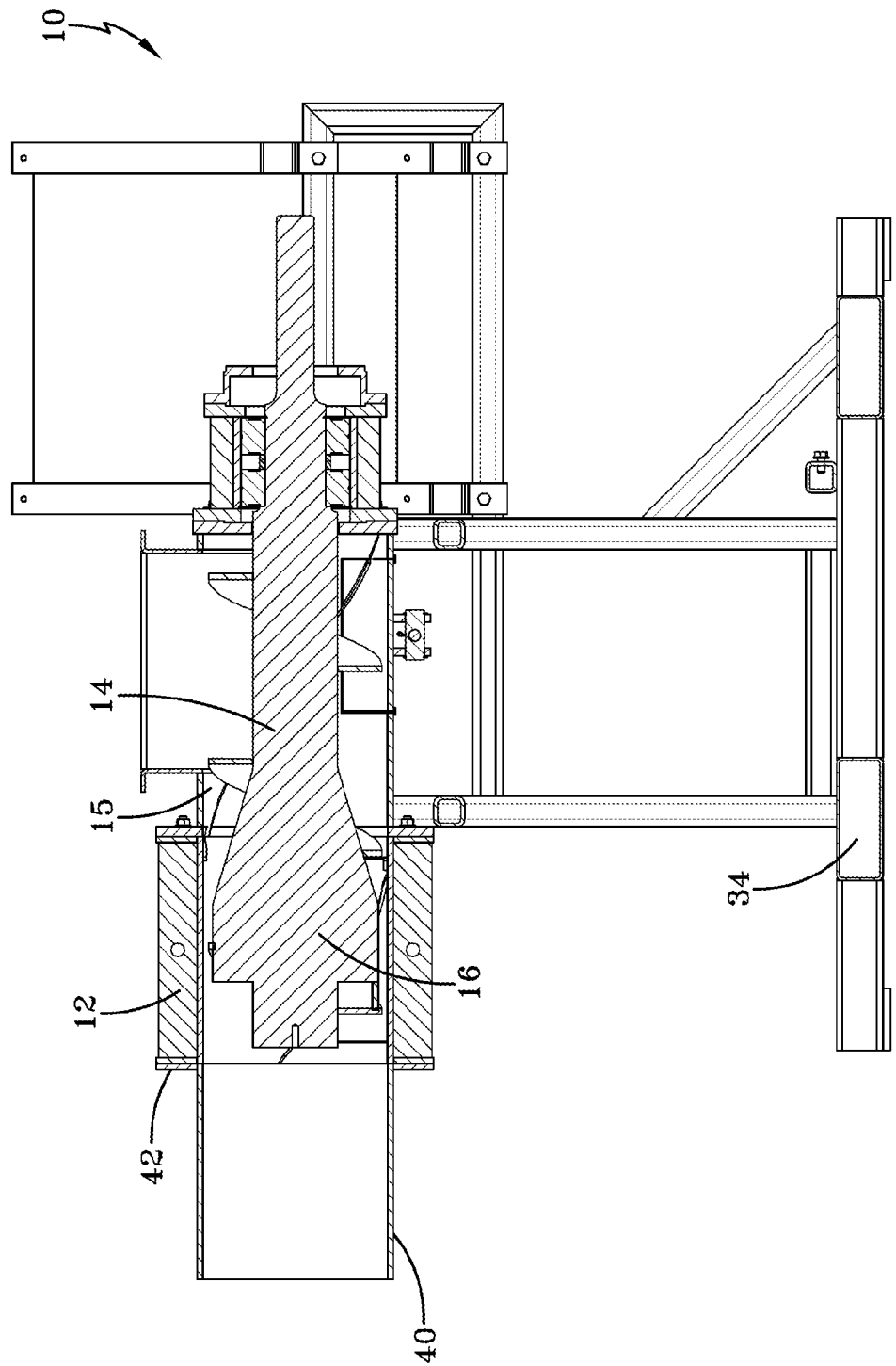
FIG. 2 is a cross-sectional view of the auger system of FIG. 1.

FIGS. 1 and 2 show one example of an auger system 10 comprising a pressure relief tube 12. Auger system 10 is an example of a system that is adapted to crush material. In particular, as can be seen in FIG. 2, pressure relief tube 12 extends around auger screw 14. More particularly, in this example, pressure relief tube 12 extends around a compression or crushing section 16 of auger screw 14. In this embodiment, auger screw 14 is a reverse tapered screw, wherein compression or crushing section 16 of the shaft is leveled out at an increased dimension (e.g., diameter) such that the compression or crushing section 16 is closely situated to pressure relief tube 12. In certain other embodiments, a pressure relief tube may be used in a different type of auger system (e.g., a system not intended to crush material) having a different type of auger screw (e.g., a tapered screw) that may be used for a different purpose (e.g., material conveyance without crushing). Other embodiments may be useful in non-auger applications (e.g., conventional screw systems) or in applications that do not comprise a screw.

In this embodiment, as the material is conveyed through the auger system 10, it is adapted to crush or compress material between the compression or crushing section 16 of auger screw 14 and the pressure relief tube 12. Such as can be seen in this example, there is a sufficiently tight tolerance (i.e., a small gap) between the compression or crushing section 16 of auger screw 14 and the pressure relief tube 12 to facilitate compression or crushing of the material. On occasion, unsuitable material (e.g., material that is too large or of the wrong type to be compressed or crushed in the system) may be included in the material being processed. An exemplary embodiment of the present invention may address this situation. When unsuitable material reaches an exemplary embodiment of the pressure relief tube 12, the pressure relief tube 12 is adapted to automatically adjust to facilitate conveyance of the unsuitable material through the pressure relief tube 12. In other words, the pressure relief tube 12 is adapted to automatically expand to allow passage of the unsuitable material. Once the unsuitable material is passed, the pressure relief tube 12 is adapted to automatically return to its normal position for compression or crushing of the material. In this manner, the amount of material conveyed, as well as the efficiency of the auger system, may be greatly increased.

In this exemplary embodiment, the pressure relief tube 12 is comprised of at least one hatch 20 (which may also be referred to as a door or gate) that is adapted to automatically adjust to facilitate the conveyance of unsuitable material. In this example, each hatch 20 comprises or is associated with at least one hinge 22 and at least one spring 24. More particularly, each hatch 20 comprises or is associated with two hinges 22 and three springs 24 in this embodiment. The springs 24 in this example may be manually adjusted to set the proper compression level. When unsuitable material enters the pressure relief tube 12, springs 24 (in association with hinges 22) allow hatch 20 to open a sufficient amount to facilitate conveyance of the unsuitable material. Once the unsuitable material is sufficiently passed through the pressure relief tube 12, springs 24 are adapted to cause hatch 20 to automatically return to its normal closed position for continued compression or crushing of material.

Other examples of a pressure relief tube may have another suitable mechanism for adjusting to unsuitable material. For example, hinges or springs may be included on more than one side of a hatch. For instance, some embodiments may only comprise springs or hinges on or associated with a hatch to facilitate expansion. In other exemplary embodiments, a hatch may facilitate expansion by moving outward in a generally or substantially radial movement as compared to a rotating movement. Other examples may include other types of extendible members or extension members (i.e., expansion members) on or associated with a hatch to allow for adjustment. Furthermore, while the above exemplary embodiment particularly benefits by having the expansion members situated outside of the hollow body of pressure relief tube 12 to allow for rotation of auger 14 and/or desired clearance between pressure relief tube 12 and auger 14, other exemplary embodiments may include all or a portion of an expansion member inside a hollow body of a tube.

While the foregoing example is automatic, a pressure relief tube may also allow for unsuitable material to be manually cleared or removed. For example, unsuitable material may also be cleared or removed through an opening created by a hatch. While an automatic embodiment may be preferred for many applications, it should also be recognized that some embodiments may only provide an improved mechanism for manual clearance or removal of unsuitable material (e.g., a manually adjustable hatch in a compression section of an enclosure), which may still be an improvement over known systems.

This example of auger system 10 also includes a support stand 30. Support stand 30 includes at least one set of fork pockets for facilitating transport of the auger system 10 by forklift. In particular, this exemplary embodiment includes a first set of fork pockets 32 and a second set of fork pockets 34, each of which is adapted to receive a lift of a forklift. Support stand 30 may also be used with other types of auger systems. On the other hand, some auger systems may not include a support stand.

Figure 3:
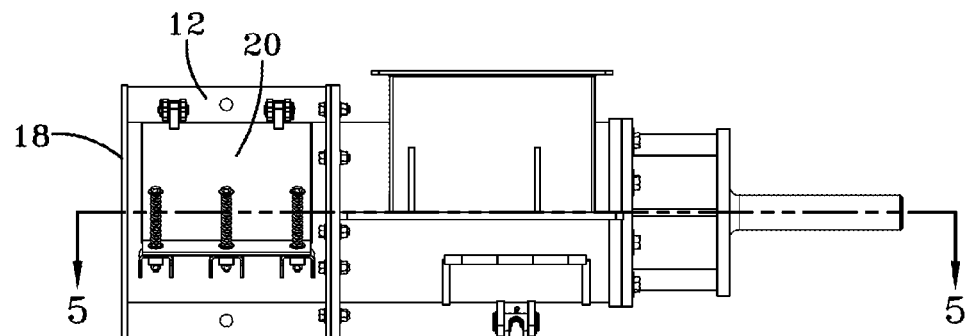
FIG. 3 is a side elevation view of an exemplary embodiment of an auger system of the present invention.
Figure 4:
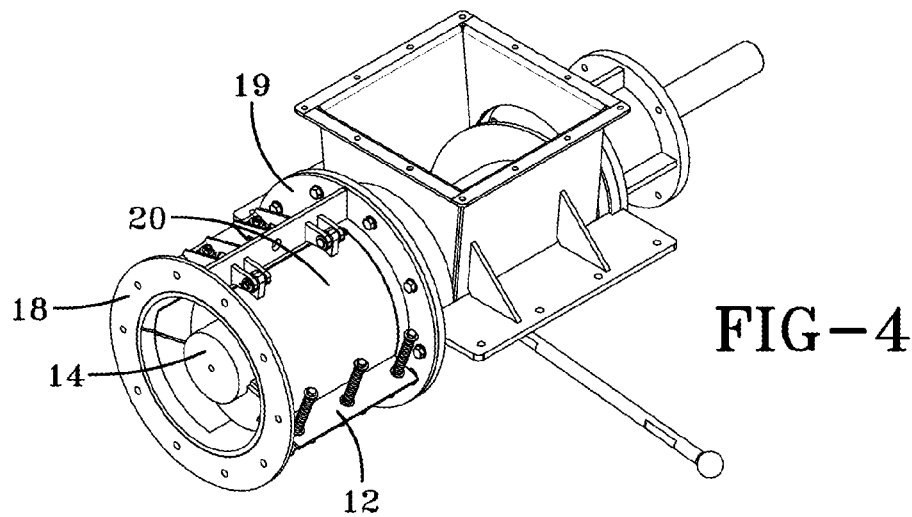
FIG. 4 is a perspective view of the auger system of FIG. 3.
Figure 5:
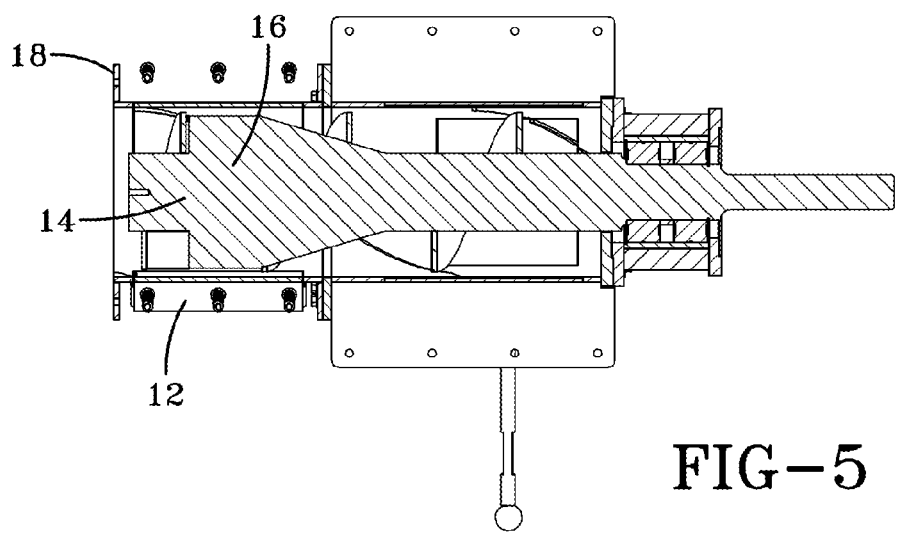
FIG. 5 is a cross-sectional view of the auger system of FIG. 3.

FIGS. 3-5 show an exemplary embodiment of an auger system without a support stand. The pressure relief tube and auger screw of this embodiment may be substantially similar to the embodiment shown in FIGS. 1 and 2. FIGS. 4 and 5 show additional views of pressure relief tube 12 extending around auger screw 14.

Referring back to FIGS. 1 and 2, a discharge tube 40 may be connected to pressure relief tube 12 to assist with conveyance of the processed material. In particular, such as shown in FIGS. 3-5, an exemplary embodiment of pressure relief tube 12 may include a rim 18 that is connected to an end of the hollow body. In the embodiment of FIGS. 1 and 2, rim 18 is connected to rim 42 of discharge tube 40. An exemplary embodiment of pressure relief tube 12 may also include a rim 19 that is connected to an opposite end of the hollow body. Such as shown in the example of FIG. 1, rim 19 may facilitate connection to a processing chamber 15 for auger 14. Other exemplary embodiments may comprise other means for facilitating connection of a pressure relief tube to another structure. FIGS. 3-5, on the other hand, show an exemplary embodiment without an additional discharge tube connected to the pressure relief tube.

FIGS. 6-11 show various views of another exemplary embodiment of a pressure relief tube. The pressure relief tube of this exemplary embodiment may be substantially similar to the embodiment shown in FIGS. 1 and 2. In this example, the pressure relief tube may also include a second hatch 26, which may be substantially similar to hatch 20. Other embodiments may also include additional hatches.

In FIGS. 6-11, the hollow body 13 of pressure relief tube 12 is a hollow cylinder (i.e., a substantially circular cross-section). Other exemplary embodiments of a hollow body may have a different cross-sectional shape (e.g., irregular, curvy, oblong, polygonal, or other non-cylindrical shapes). Such as shown in these figures, an exemplary embodiment of a hollow body may further comprise a base portion 17. In this example, base portion 17 extends completely around hollow body 13. In other exemplary embodiments, a base portion may comprise one or more isolated sections about a hollow body. This example of base portion 17 is not adapted to expand (i.e., substantially stationary). However, in other examples, a base portion may also expand.

FIGS. 12A-B and 13A-B show examples of a pressure relief tube that may be substantially similar to the embodiments shown in the preceding figures. In FIGS. 12A and 12B, hatch 20 and hatch 26 are shown in a closed position. FIGS. 13A and 13B, on the other hand, show hatch 20 and hatch 26 in a partially open or expanded position. In particular, each hatch 20, 26 is configured to provide a respective opening 50, 52 through hollow body 13 in response to a respective force applied against the hatch from inside 60 the hollow body 13. In other words, each hatch 20, 26 may be adapted to expand in response to respective forces applied against the hatches from inside 60 the hollow body 13 such that an inner dimension (e.g., diameter) of the tube is increased.

Each spring 24 allows the respective hatch to adjust to unsuitable material. As compared to FIGS. 13A and 13B, a hatch may adjust to a lesser or further open position, if necessary, as allowed by the springs 24. In this embodiment, each hatch 20, 26 may expand by independently moving outwardly to provide a respective opening 50, 52 through hollow body 13. In other exemplary embodiments, multiple hatches may move in combination to facilitate further conveyance of the material through the pressure relief tube.

In an exemplary embodiment, multiple base edges of a hatch may be adjacent to the base portion. Such as shown in FIGS. 12A and 13A, each base edge 20A, 20B, 20C, 20D of hatch 20 is surrounded by base portion 17. As a result, opening 50 is through base portion. In other embodiments, fewer than all of the base edges may be surrounded by the base portion.

In an exemplary embodiment, at least one hinge 22 connects a hatch to base portion 17. As a result, at least one hinge 22 is adapted to facilitate movement of a hatch to provide an opening in response to force applied against the hatch from inside the hollow body 13. Such as shown in the examples of FIGS. 12A-B and 13A-B, base portion 17 may comprise at least one rib 70 that extends outward from hollow body 13 such that at least one hinge 22 may be connected between a rib 70 and a hatch. Other embodiments may not include a rib.

As aforementioned, at least one spring 24 is in association with a hatch in an exemplary embodiment. A spring 24 is adapted to allow movement of a hatch to provide an opening (i.e., expansion) in response to force applied against the hatch from inside the hollow body. In an exemplary embodiment, a spring 24 is further adapted to facilitate closing of the hatch when the force is not applied against the hatch from inside the hollow body.

In one example, a hatch may comprise a flange 80 that extends outward from the hollow body 13. In such an embodiment, a brace 90 may also be connected to base portion 17. To facilitate operation of a spring 24, a support 25 may extend between flange 80 and brace 90, wherein support 25 supports spring 24. Such as in this example, support 25 may be a bolt, and brace 90 may comprise a socket 100 into which support 25 extends. Such as shown in the embodiments of FIGS. 12A-B and 13A-B, a nut 110 may engage a portion of a support 25 that extends through socket 100. In another embodiment, a socket may be threaded in order to engage a support. In still other examples, a support may simply terminate at a surface or in a socket.

In the embodiments shown in FIGS. 12A-B and 13A-B, a spring 24 is positioned on a side of flange 80 that is away from brace 90. Another embodiment may reverse the location of a spring 24. For example, a spring may be positioned on a side of brace 90 that is away from flange 80. Other embodiments may comprise other mechanisms for facilitating the connection and operation of a spring.

It should be recognized that some embodiments of a pressure relief tube may not extend completely about an auger screw. In other words, some embodiments of a pressure relief tube may only extend partially around an auger screw. Furthermore, as aforementioned, some embodiments may have different purposes that do not involve an auger screw.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the invention. It is the intention, therefore, to limit the invention only as indicated by the scope of the claims.

What is claimed is:

1. A tube comprising:
   a hollow cylinder comprising a base portion and a hatch, said hatch configured to provide an opening through said hollow cylinder in response to force applied against said hatch from inside said hollow cylinder; and
   a spring in association with said hatch, said spring adapted to allow movement of said hatch to provide said opening in response to force applied against said hatch from inside said hollow cylinder, and said spring adapted to facilitate closing of said hatch when said force is not applied against said hatch from inside said hollow cylinder.

2. The tube of claim 1 wherein each base edge of said hatch is surrounded by said base portion.

3. The tube of claim 1 wherein said opening is through said base portion.

4. The tube of claim 1 further comprising at least one hinge that connects said hatch to said base portion, said at least one hinge adapted to facilitate movement of said hatch to provide said opening in response to force applied against said hatch from inside said hollow cylinder.

5. The tube of claim 4 wherein said at least one hinge is situated outside of said hollow cylinder.

6. The tube of claim 5 wherein:
   said base portion comprises a rib that extends outward from said hollow cylinder; and
   said hinge is connected between said rib and said hatch.

7. The tube of claim 1 wherein said hatch comprises a flange that extends outward from said hollow cylinder, said tube further comprising:
   a brace connected to said base portion; and
   a support extending between said flange and said brace, said support supporting said spring.

8. The tube of claim 7 wherein said spring is positioned on a side of said flange that is away from said brace.

9. The tube of claim 7 wherein said spring is positioned on a side of said brace that is away from said flange.

10. The tube of claim 7 wherein:
    said support is a bolt; and
    said brace comprises a socket into which said bolt extends.

11. The tube of claim 10 further comprising a nut that is engaged with a portion of said bolt that extends through said socket.

12. The tube of claim 1 where said hollow cylinder further comprises at least a second hatch that is configured to provide an opening through said hollow cylinder in response to another force applied against said hatch from inside said hollow cylinder.

13. The tube of claim 1 further comprising a rim connected to an end of said hollow cylinder, said rim configured to facilitate connection of said tube to another device.

14. A tube comprising:
- a hollow body having an opening that extends from one end to an opposite end, said hollow body comprising a base portion and a hatch, said hatch configured to provide an opening through said hollow body in response to force applied against said hatch from inside said hollow body; and
- a spring in association with said hatch, said spring adapted to allow movement of said hatch to provide said opening in response to force applied against said hatch from inside said hollow body, and said spring adapted to facilitate closing of said hatch when said force is not applied against said hatch from inside said hollow body.

15. The tube of claim 14 further comprising at least one hinge that connects said hatch to said base portion, said at least one hinge adapted to facilitate movement of said hatch to provide said opening in response to force applied against said hatch from inside said hollow body.

16. A system comprising:
- an auger adapted to process material; and
- a hollow body that extends around said auger, said hollow body comprising a base portion and a hatch, said hatch configured to provide an opening through said hollow body in response to force applied by an unsuitable portion of said material against said hatch such that an inner dimension of said hollow body is adapted to be increased to allow for passage of said unsuitable portion of said material through said hollow body; and
- a spring in association with said hatch, said spring adapted to allow movement of said hatch to provide said opening in response to force applied by said unsuitable portion of said material against said hatch, and said spring adapted to facilitate closing of said hatch when said force is not applied against said hatch.

17. The system of claim 16 wherein said system is configured to crush said material between said auger and said hollow body.

18. The system of claim 16 further comprising at least one hinge that connects said hatch to said base portion, said at least one hinge adapted to facilitate movement of said hatch to provide said opening in response to force applied by said unsuitable portion of said material against said hatch.

19. The system of claim 16 wherein said hatch is configured to provide said opening through said hollow body in a rotating movement.

20. The system of claim 16 wherein said hatch is configured to provide said opening through said hollow body in a radial movement.

* * * * *